United States Patent Office 3,099,622
Patented July 30, 1963

3,099,622
PRODUCTION OF CLARIFIED ACIDIC
PHOSPHATIC SOLUTIONS
Clarence J. Woerther, Lakeland, Fla., assignor to International Minerals & Chemical Corporation, a corporation of New York
No Drawing. Filed Oct. 25, 1960, Ser. No. 64,717
1 Claim. (Cl. 210—49)

This invention generally relates to a process for the production of clarified acidic phosphatic solutions. More particularly, the invention relates to a process for the efficient separation of impurities from solutions of inorganic acidic phosphatic materials such as those formed by the aqueous leaching of acidulated phosphate rock.

In conventional methods for the production of aqueous solutions of inorganic acidic phosphatic materials, phosphate rock is reacted with sulfuric acid and the reaction product is filtered and water leached to yield a crude aqueous solution product in which is suspended a substantial quantity of solid impurities. The crude aqueous solution also contains dissolved impurities. This crude aqueous product is the so-called wet process phosphoric acid of commerce.

The problems occasioned by dissolved impurities and suspended solid impurities are particularly acute with respect to wet process phosphoric acid. Conventional practice in the preparation of phosphoric acid yields a crude wet process phosphoric acid containing from about 15% to about 35% by weight of phosphorus pentoxide ($P_2O_5$) and a substantially portion of suspended solid impurities which do not readily settle. Such crude dilute wet process acid is normally concentrated to increase the $P_2O_5$ content to at least about 45% by weight and more frequently to at least 50% by weight. The resultant concentrated acid is normally dark in color. The concentration procedure necessarily also serves to proportionately increase the concentration of impurities in the acid and yields concentrated acid solutions containing dissolved impurities and frequently containing about 15% to about 30% by weight of suspended solids, which are particularly difficult to remove from the solution.

In general, it has been determined that the impurities present in wet process acidic phosphatic solutions, such as wet process phosphoric acid, comprise calcium sulfate hemihydrate ($CaSO_4 \cdot \frac{1}{2}H_2O$), calcium sulfate anhydrite ($CaSO_4$), sodium, potassium, iron and aluminum; and in acidic solutions resulting from concentration or other procedures in which organic materials are introduced in small amounts, double salts of iron and aluminum phosphates with phosphoric acid bearing organic constituents. These constituents may theoretically be represented by the formula $RPO_4 \cdot 2H_3PO_4$, where "R" is an organic radical derived from the organic material employed in the production of the particular phosphatic solution treated. There may also be varying amounts of other organic and inorganic matter present. These various impurities are desirably substantially removed in order to have an acidic phosphatic solution which is saleable in competition with "furnace phosphoric acid" for the manufacture of fertilizers and animal feed grade products.

Upon standing in storage or during shipment in tank cars or the like, such acidic phosphatic solutions deposit a layer of solid material, an effect which renders handling of the stored or shipped acid exceedingly difficult and frequently economically infeasible. Some solids and color may be removed from the crude solution by filtration. However, the concentrated acid is very viscous and difficult to filter and, further, the solids are of such a nature that they readily plug the filter. Moreover, the solids are very difficult to remove from the filter. Also, even when the acid is filtered, upon further standing solids form in the solution and settle out. The solids which subsequently form in the solution and settle out of the solution are usually denominated post-precipiated solids, and the mechanism is termed post-precipitation.

The removal of impurities from wet process phosphatic solutions as contemplated by this invention differs fundamentally from the defluorination of similiar phosphatic solutions. The present invention, which may only incidentally reduce the fluorine content of the acidic phosphatic solution treated, is applicable to remove impurities from defluorinated or undefluorinated aqueous solutions of inorganic phosphates.

It is accordingly an object of this invention to provide a method for efficiently producing a clarified acidic phosphatic solution.

It is another object of the invention to provide a method for efficiently removing impurities from acidic inorganic phosphatic materials.

It is another object to provide a process for the production of wet process phosphoric acid which demonstrates substantially less post-precipitation of solids than conventional wet process phosphoric acid.

It is a further object of the invention to provide a wet process phosphoric acid relatively free of suspended solid impurities that may be shipped or stored over an extended time period without appreciable post-precipitaiton or sedimentation.

It is an additional object of the invention to provide an economical process for the clarification of concentrated wet process phosphoric acid.

It is a more specific object of the invention to provide an economical process for the clarification of concentrated wet process phosphoric acid which does not of necessity utilize clarification agents.

It is another specific object of the invention to provide a process for the continuous clarification of concentrated wet process phosphoric acid which is appropriate for installation in a conventional wet process phosphoric acid plant.

In accordance with the present invention, it has been discovered that an eminently satisfactory clarified acidic phosphatic solution can be achieved by the process of this invention which does not require the use of clarification reagents and yet provides for removal of substantially all of the solids from the phosphatic solution.

Generally described, it has been discovered that solutions of acidic inorganic phosphatic materials, containing dissolved impurities and suspended solid impurities, can efficiently be clarified by subjecting such solutions to shearing, and thereafter handling the solution to settle at least a substantial portion of said impurities, and separating the clarified solution from the settled impurities.

It has been previously suggested to clarify wet process phosphoric acid by using specific clarification agents such as conventional commercial flocculating agents which are stable in concentrated mineral acids. These clarification agents increase the settling rate of solids suspended in the wet process phosphoric acid. The cost of the clarification reagent, however, adds to the cost of the process. Further, it is often desirable to produce a clarified solution without the use of clarification reagents. In the process of this invention a clarification agent is not necessary; however, when desired, a clarification agent may be utilized in the manner hereinafter set forth.

It has also been suggested that a clarified wet process phosphoric acid may be obtained by centrifuging a crude wet process phosphoric acid that has been held in a quiescent state for a sufficient amount of time to permit precipitation of substantially all of the solids from the supersaturated solution. Using such a process it was believed necessary to maintain the acid in a quiescent state for at least five days before performing the centrifugal separation of the supernatant liquid. Such a prolonged period of holding has the disadvantage of requiring a large holding tank.

In accordance with this invention, an inorganic acidic phosphatic solution containing impurities is subjected to shearing. The exact reason why shearing is effective in producing a clarified acid exhibiting less post-precipitation than conventional wet process phosphoric acid has not been definitely established. One theory is that the shearing force breaks any super saturation that may exist thereby hastening the formation of the solids. In other words, the shearing force causes the solids, which normally form slowly in the solution and form the post-precipitated solids, to form rapidly.

The shearing is effective to some degree in substantially all amounts such that the relative amounts of shearing utilized do not constitute an essential feature of the invention. In general, the practical upper limit of the amount of shearing utilized is determined to a significant extent by economic considerations, including power costs, and cost of separation of precipitated solids from the clarified acidic solution. The amount of shearing is generally greater than 1.0 foot pounds per pound of clarified acidic solution and preferably greater than 10 foot pounds per pound of acidic solution.

The process of the invention can be practiced under any desired temperature conditions. The settling rate of the suspended solids and the quantity of solids remaining in the clarified acid are, however, both directly in proportion to the treatment and settling temperature. Accordingly, the practice of the invention at elevated temperatures is preferred. The clarification procedure is preferably performed at temperatures within the range of from about 100° F. to about 250° F. However, higher or lower temperatures may be used. Generally, low temperatures increase the viscosity of the solution with consequent reduction in the settling rate.

The process of the invention is effective in the clarification of acidic phosphatic solutions in all concentrations. Acid phosphate solutions formed from acidulated phosphate rock may constitute substantially calcium free phosphoric acid, or, depending upon the degree of acidulation, approach monocalcium phosphate solutions characterized by a $CaO/P_2O_5$ mole ratio of about 1:1. The invention is useful in the clarification of all such solutions and more specifically is applicable to acidic phosphatic solutions ranging from phosphoric acid to monocalcium phosphate. The problems which attend the clarification of acidic phosphatic solutions containing in excess of about 45% by weight of $P_2O_5$ is particularly acute and the invention finds important utility in the efficient clarification of such materials. Wet process phosphoric acid having a $P_2O_5$ weight concentration between about 52% and about 56% is effectively clarified using the process of this invention.

It has also been determined that conventional commercial flocculating agents, and amine clarification agents, stable in concentrated mineral acids, and specifically stable in the acidic phosphatic solution being treated, may advantageously be utilized subsequent to the shearing procedure of this invention, to expedite the solids settling rate and yield clarified acidic solutions containing a comparatively smaller amount of residual solid impurities. Flocculating agents suitable for such utilization include water-soluble high molecular weight synthetic polymers such as the polyacrylamides which are sold under the commercial trade name "Separan," guar, the hydrolyzed polyacrylonitrile resins or the salts thereof such as the sodium and potassium salts, and the like. Such commercial flocculating agents are employed in the conventional manner normally in water solution, in about 0.05% to about 2% by weight, in an amount requisite to provide from about 0.001 to about 2 pounds thereof per ton of acidic phosphatic solution treated, and more preferably from about 0.003 to about 0.5 pound per ton of acidic phosphatic solution treated.

Useful amine clarification agents are the amine-type cationic collectors used in flotation processes for the beneficiation of ores. Preferred agents are high molecular weight aliphatic amines containing from about 8 to 20 carbon atoms, and mixtures containing these amines. Mixtures of amines and amine salts may be used as well as crude amines such as tallow amines, tall oil amines, coconut oil amines, and soya oil amines. The preferred amines are relatively insoluble in water, however, they are water dispersible. The amine clarification agents are employed in a minor proportion requisite to provide fom about 0.05 to about 50 pounds and preferably from about 0.03 to about 10 pounds of amine agent per ton of acidic solutions to be clarified.

After the shearing treatment, and after the addition of the amine type clarification reagent, and/or the flocculating agent, when used, the mixture is handled in a manner to settle the solids to produce a clarified fraction and a solids-carrying fraction. The mixture may be centrifuged thereby settling the solids, however, the mixture is preferably maintained quiescent thereby permitting the solids to settle.

The sludge or solids layer resulting from the clarification of acidic phosphatic solutions in accordance with this invention contains a substantial proportion of $P_2O_5$ and is useful, inter alia, in the manufacture of fertilizers and particularly as a binding agent for the manufacture of granulated phosphatic fertilizers.

In order to give a fuller understanding of the invention, but with no intention to be limited thereto, the following specific examples are given.

EXAMPLE I

Two samples designated A and B, of crude wet process phosphoric acid having a 54% $P_2O_5$ content, were treated as follows. Sample A was treated in accordance with this invention and Sample B was used as a control. Sample A was pumped as a jet directed at right angles to the teeth of a 10-inch diameter circular saw blade rotating at 7900 r.p.m. The rate of acid feed was about one gallon per minute. The acid was cycled through the saw blade five times. The temperature of the fresh acid was 147° F. and after the first cycle it reached an equilibrium temperature with the apparatus of about 113° F. which was maintained for all of the other cycles. Sample A and B were then maintained at room temperature for 24 hours. After 24 hours the volume percent of solids in sheared Sample A was about 90% while the volume percent of solids in unsheared Sample B was only 17%.

This test illustrates that the shear method of this invention causes solids to form in the wet process phosphoric acid at a much higher rate. Since the solids are precipitated out of the acid, the post-precipitation from a recovered clarified acid fraction is substantially less.

EXAMPLE II

Two samples, designated C and D, of fresh crude wet process phosphoric acid, having a 54% $P_2O_5$ content, were treated as follows. Sample C was treated in accordance with this invention and Sample D was used as a control. Sample C was subjected to shearing as outlined in Example I, with five cycles again being utilized. A sample of sheared acid was taken after each cycle through the blade. A crude mixture of primary aliphatic amines of 8 to 18 carbon atoms was mixed with each sheared sample and the control D in order to expedite settling of the solids. The amine reagent was used in an amount of 0.05% by weight of the acid. The samples were then maintained quiescent at 149° F. for 24 hours and the weight percent of precipitated solids in each sample was determined. A clarified acid fraction was then decanted from each sample and the clarified fractions were maintained quiescent at room temperature for 7 days. At the end of the 7-day settling period, the weight percent of solids post-precipitated out were measured. The results of these tests are given in the following table.

Table

|  | 24 Hrs. at 149° F., Percent by Weight of Solids | 7 Days at Room Temp., Percent by Weight of Solids |
| --- | --- | --- |
| Sample D—Control | 7.4 | 1.25 |
| Sample C—Sheared: |  |  |
| After 1st cycle | 9.2 | 0.7 |
| After 2nd cycle | 8.4 | 0.6 |
| After 3rd cycle | 10.0 | 0.35 |
| After 4th cycle | 9.4 | 0.34 |
| After 5th cycle | 9.7 | 0.10 |

These results clearly illustrate that less post-precipitation is encountered from a clarified acid fraction that has been subjected to shearing in accordance with the present invention. A significant advance in minimizing the problem of post-precipitation in wet process phosphoric acid is, therefore, accomplished by the invention.

The description of the invention utilized specific reference to certain process details; however, it is to be understood that such details are illustrative only and not by way of limitation. Other modifications and equivalents of the invention will be apparent to those skilled in the art from the foregoing description.

I claim:

A method for the production of a clarified wet process phosphoric acid exhibiting a reduced amount of post-precipitation of organic phosphates from substantially solids free concentrated wet process phosphoric acid containing at least 45% by weight of $P_2O_5$ normally exhibiting post-precipitation of organic phosphates which comprises subjecting substantially solids free concentrated wet process phosphoric acid containing at least 45% by weight of $P_2O_5$ normally exhibiting post-precipitation of organic phosphates to at least 1.0 foot pound of shearing per pound of solution at a temperature within the range of from about 100° F. to about 250° F., thereafter maintaining the sheared solution quiescent to settle at least a substantial portion of solids containing organic phosphates from said solution, and separating the settled solids from the clarified supernatant wet process phosphoric acid solution which may be shipped or stored over an extended time period without appreciable post-precipitation.

References Cited in the file of this patent
UNITED STATES PATENTS

| | | |
| --- | --- | --- |
| 1,172,528 | Jalowetz et al. | Feb. 22, 1916 |
| 2,072,710 | Crane | Mar. 2, 1937 |
| 2,382,605 | Carter | Aug. 14, 1945 |
| 2,509,261 | Carosella | May 30, 1950 |
| 2,657,025 | Henrard | Oct. 27, 1953 |
| 2,685,369 | Crossley | Aug. 3, 1954 |
| 2,922,761 | Davenport | Jan. 26, 1960 |
| 2,960,535 | Bylsma | Nov. 15, 1960 |
| 2,968,528 | Tuttle | Jan. 17, 1961 |

FOREIGN PATENTS

| | | |
| --- | --- | --- |
| 493,772 | Belgium | Aug. 8, 1950 |

OTHER REFERENCES

Water and Sewage Works (periodical), vol. 102, No. 12 (November 1955), article by Symons, pages 470–475.

"Separation and Purification," Part I, by Weissberger, Interscience Publishers, Inc., New York (1956), pages 481 and 482.